United States Patent [19]

McCleary

[11] Patent Number: 4,537,441

[45] Date of Patent: Aug. 27, 1985

[54] CAMPER-TRAILER

[76] Inventor: Donald J. McCleary, 733 E. McKinney, Neosho, Mo. 64850

[21] Appl. No.: 504,867

[22] Filed: Jun. 15, 1983

[51] Int. Cl.³ .................. B62D 63/06; B62D 29/04
[52] U.S. Cl. ............................ 296/181; 296/31 P; 296/168; 280/204; 220/4 B; D12/102
[58] Field of Search ........ 296/27, 31 P, 156, 168-172, 296/173, 181, 182, 185; D12/102-105, 114; 280/203, 204, 789, 402; 220/4 B, 4 E

[56] References Cited

U.S. PATENT DOCUMENTS

| D. 102,182 | 12/1936 | Falk | D12/102 |
|---|---|---|---|
| D. 144,748 | 5/1946 | Weissberg | 296/168 |
| D. 268,178 | 3/1983 | Reid | D12/102 |
| 2,496,055 | 1/1950 | King | 296/172 |
| 2,569,082 | 9/1951 | Wheeler | 296/172 |
| 2,708,397 | 5/1955 | Cook et al. | 280/789 |
| 2,892,635 | 6/1959 | Hustead | 296/181 |
| 3,498,633 | 3/1970 | Hopkins | 280/803 |
| 3,550,948 | 12/1970 | Thompson, Jr. | 296/185 |
| 3,726,541 | 4/1973 | Connell | 280/789 |
| 4,057,283 | 11/1977 | Barnett | 296/173 |
| 4,079,956 | 3/1978 | Headington, Jr. | 296/173 |
| 4,372,568 | 2/1983 | Campbell | 296/173 |
| 4,396,208 | 8/1983 | Koch | 296/31 P |

FOREIGN PATENT DOCUMENTS

| 2947680 | 7/1981 | Fed. Rep. of Germany | 296/172 |
|---|---|---|---|
| 2499014 | 8/1982 | France | 296/181 |

OTHER PUBLICATIONS

Popular Mechanics, Mar. 1981, p. 129.

Primary Examiner—Robert B. Reeves
Assistant Examiner—Dennis H. Pedder
Attorney, Agent, or Firm—Harvey B. Jacobson

[57] ABSTRACT

A main frame is provided including opposite side rear wheels and a forwardly projecting tongue for coupling behind a motorcycle or other motor vehicle. A body assembly is supported from the main frame and includes an upwardly opening bottom half and a downwardly opening upper half downwardly telescoped over the bottom half and secured thereto. The upwardly opening bottom half includes upwardly projecting peripheral walls and the top half includes depending peripheral skirt walls telescoped downwardly over the peripheral walls of the bottom half. Portions of the opposite skirt walls spaced intermediate the front and rear ends thereof are vertically abbreviated and terminate downwardly in outwardly flared and arched integral fenders. Corresponding portions of the bottom half side peripheral walls include upper upwardly arched marginal extensions which abut and are anchored to the underside portions of the inner portions of the fenders and define inner fender well walls. The upper half of the body assembly includes structure for gaining access to the interior of the body assembly and the interior of the body is of a length and width to receive two side-by-side persons in prone positions for sleeping purposes.

12 Claims, 6 Drawing Figures

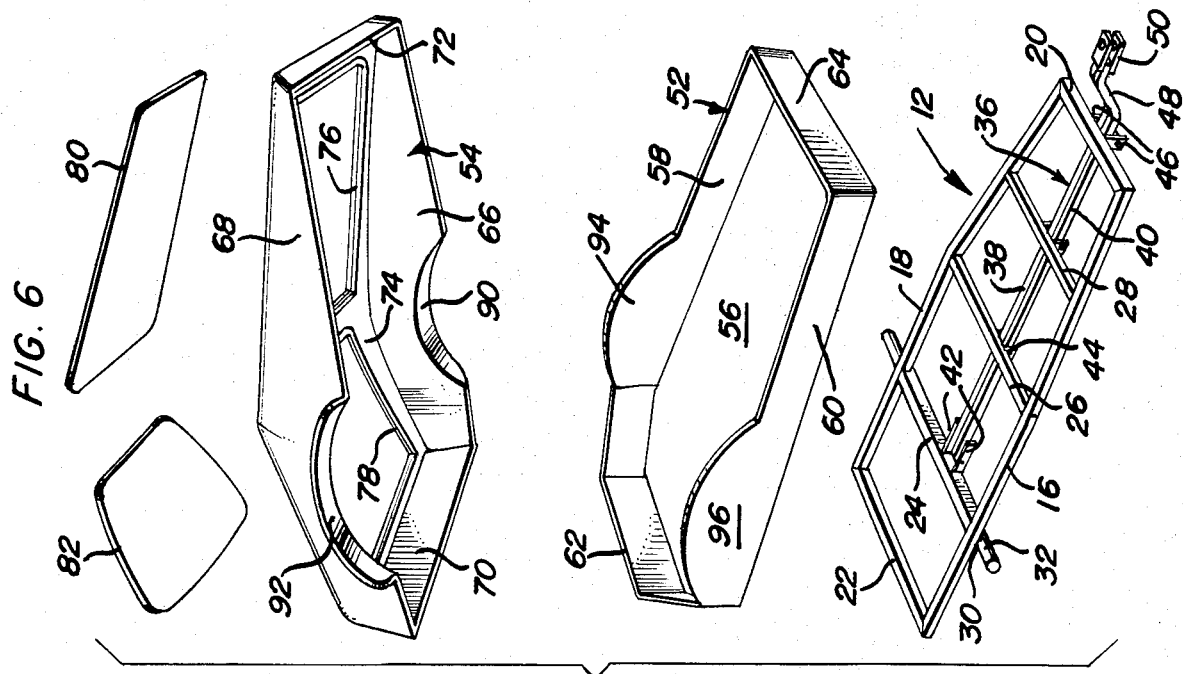
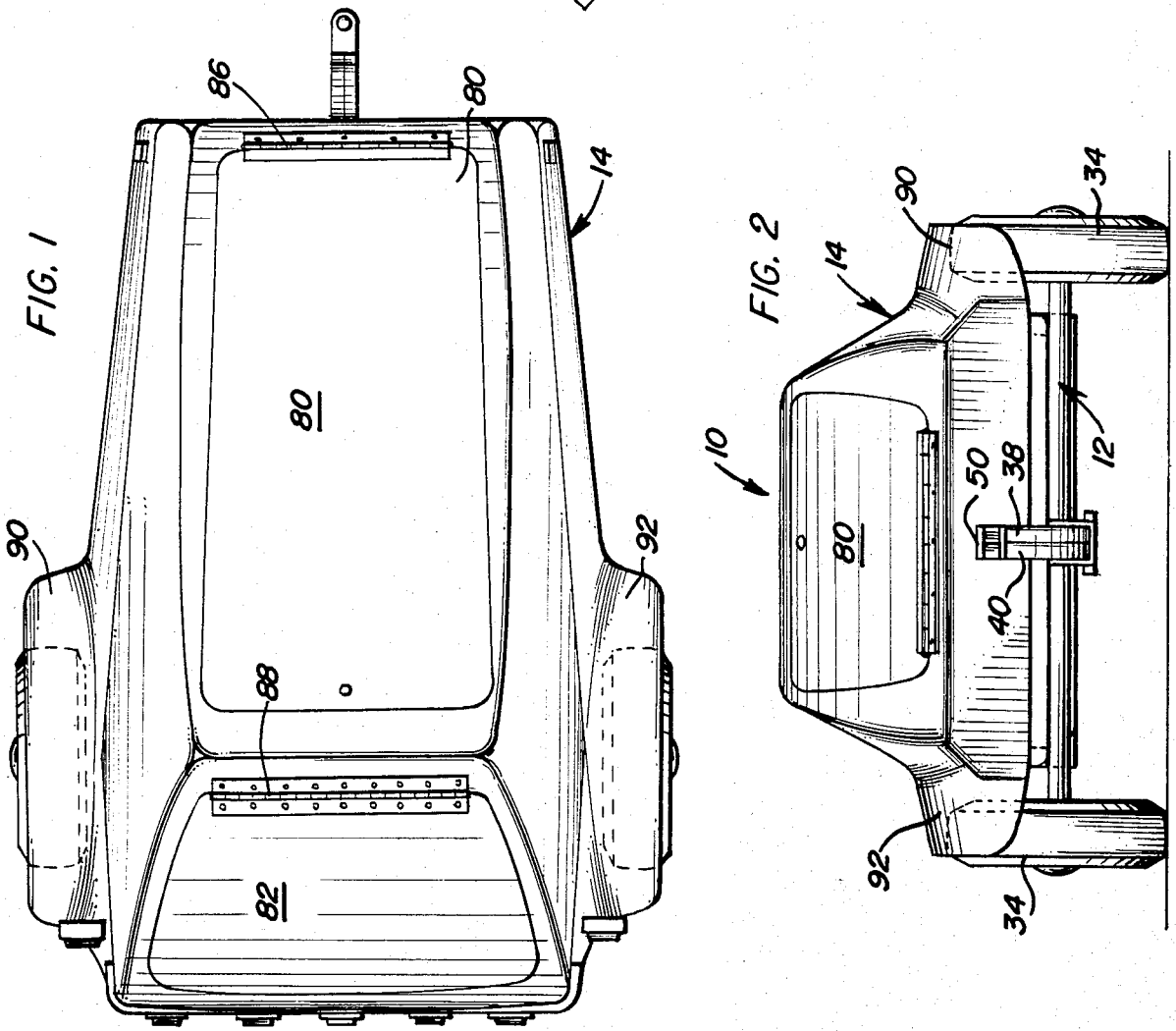

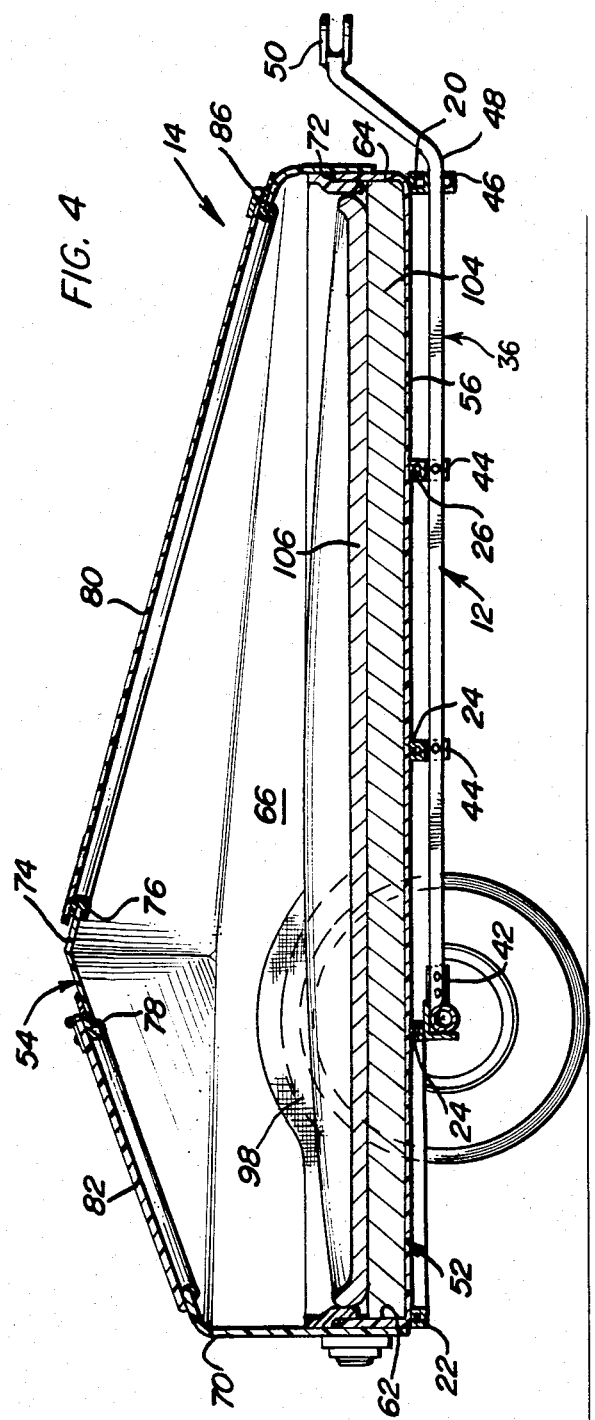
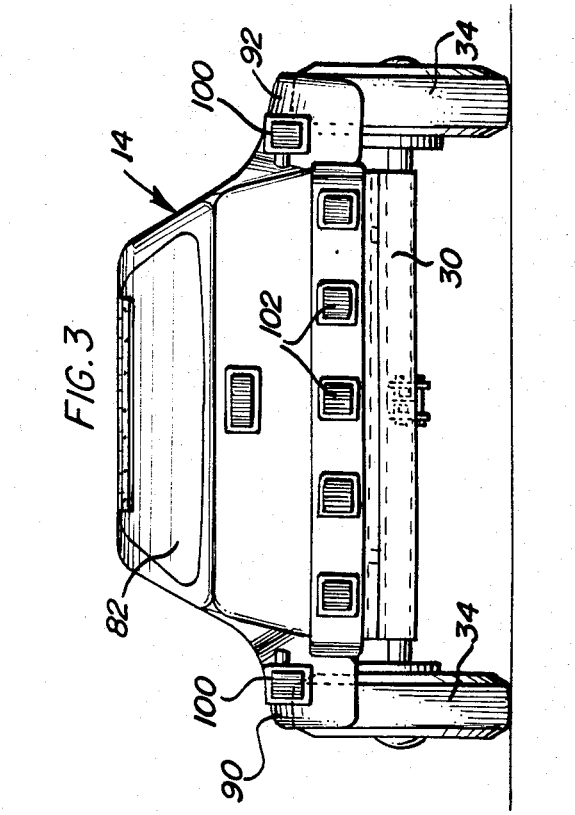
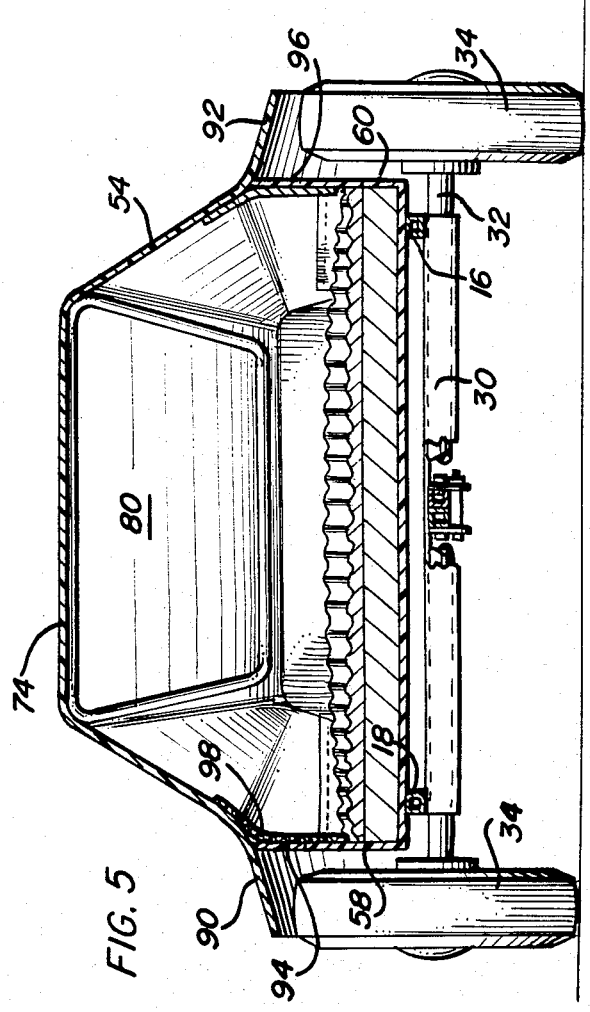

4,537,441

1

CAMPER-TRAILER

BACKGROUND OF THE INVENTION

Although various forms of motorcycle trailers and other small trailers heretofore have been designed, few, if any, have been designed to enable two persons to be provided a sleeping area without incorporating a "pop-up" or "fold-out" tent construction supported from those trailers and which occupy considerable portions of the interiors of the trailers and thus severely reduce the useful storage areas therewithin during transit. Accordingly, a need exists for a small motorcycle or other vehicle trailer which may be used as a substantially closed sleeping area by two persons and yet which may be used as a reasonably large volume storage area during transit.

Examples of motorcycle trailers as well as other trailers including some of the general structural and operational features of the instant invention are disclosed in U.S. Pat. Nos. D240,213, D240,806, 3,823,975, 4,057,283 and 4,079,956.

BRIEF DESCRIPTION OF THE INVENTION

The trailer of the instant invention includes a tubular lightweight chassis and a one piece lightweight molded fiberglass, or other similar material, body. The body is constructed in upper and lower halves which are subsequently joined together in a water tight manner and the body is aerodynamically clean to offer little wind resistance when in transit.

The upper portion of the body includes two access openings with suitable closures therefor and the interior of the body is of a length and width to comfortably receive two average size adults in side-by-side prone positions for sleeping purposes. The interior of the trailer may be used for storage when in transit and for sleeping when stationary.

The main object of this invention is to provide a lightweight motorcycle trailer and other small trailers which may be towed behind a vehicle during transit and used for storage of luggage or other materials, and yet which may be comfortably utilized by two persons as a sleeping area when stationary.

Another object of this invention is to provide a lightweight trailer having a body construction which is aerodynamically clean.

Still another object of this invention is to provide a trailer incorporating a readily constructed lightweight tubular chassis as well as a lightweight unitized body incorporating separately molded but permanently joined upper and lower body halves.

Another important object of this invention is to provide a trailer body incorporating integral fenders and inner fender well walls.

A final object of this invention to be specifically enumerated herein is to provide a lightweight trailer in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a top plan view of a trailer constructed in accordance with the present invention;

FIG. 2 is a front elevational view of the trailer;

FIG. 3 is a rear elevational view of the trailer;

FIG. 4 is an enlarged longitudinal vertical sectional view of the trailer taken substantially upon a plane passing through the longitudinal center line of the trailer;

FIG. 5 is a transverse vertical sectional view of the trailer; and

FIG. 6 is an exploded perspective view of the trailer independent of the ground engaging support wheels thereof.

DETAILED DESCRIPTION OF THE INVENTION

Referring now more specifically to the drawings the numeral 10 generally designates the trailer of the instant invention. The trailer 10 includes a main frame referred to in general by the reference numeral 12 and a unitized body assembly referred to in general by the reference numeral 14.

The main frame 12 includes opposite side lightweight tubular frame members 16 and 18 whose forward ends are slightly forwardly convergent and interconnected by a forward transverse lightweight tubular frame member 20. The rear ends of the frame members 16 and 18 are interconnected by a rear transverse frame member 22 and three additional transverse frame members 24, 26 and 28 extend and are secured between the frame members 16 and 18 intermediate the frame members 20 and 22.

The lower portion of the frame member 24 supports a forwardly and downwardly opening angle member 30 therefrom in which a solid axle member 32 is secured. The opposite ends of the axle member 32 rotatably journal ground support wheels 34 in a conventional manner. Although the axle member 32 is illustrated and described as a rigid axle member, other suitable axle assemblies may be used including spring mounted axle assemblies.

The main frame 12 includes a center longitudinal structural member 36 comprising a pair of side-by-side tubular members 38 and 40 and the rear ends of the tubular members 38 and 40 are secured between forwardly projecting brackets 42 carried by the axle member 32. In addition, the transverse frame members 26 and 28 include depending brackets 44 between which the tubular members 36 and 40 are also secured and the front transverse frame member 20 includes yet another pair of depending brackets 46 between which the forward end portions of the tubular members 36 and 40 are clamped by a transverse fastener secured through the brackets 46 and passing immediately beneath the forward end portions of the tubular members 38 and 40.

The forward terminal ends of the tubular members 38 and 40 curve upwardly as at 48 and then forwardly and support a forward end tow hitch 50 for pivotal coupling to a suitable tow hitch carried by a motorcycle.

The body assembly 14 includes a lower half 52 and an upper half 54. The lower half 52 includes a substantially horizontal bottom wall 56 including upstanding peripheral walls 58, 60, 62 and 64 which are peripherally continuous and the top half 54 includes depending skirt walls 66, 68, 70 and 72 interconnected at their upper ends by a top wall 74. The top wall 74 includes front and rear access openings 76 and 78 with which hinged covers 80 and 82 are operatively associated and each of the openings 76 includes a peripherally extending drip lip. The cover 80 is forwardly and downwardly inclined and hinged to the top wall 74 by a piano hinge 86 and the cover 82 is rearwardly and downwardly inclined and hinged to the top wall 74 by a piano hinge 88. Further, the cover 80 extends along a greater longitudinal extent of the trailer 10 than the cover 82.

Intermediate side portions of the skirt walls 66 and 68 are vertically abbreviated and terminate downwardly in outwardly flared portions 90 and 92 defining outwardly projecting fenders. In addition, intermediate portions of the peripheral walls 58 and 60 include upwardly arched portions 94 and 96 whose upper arcuate edges abut the undersides of the fenders 90 and 92 at their inner extremities and define inner fender well walls. In addition, all of the overlapping and abuttingly engaged portions of the lower and upper halves 52 and 54 are sealed relative to each other by an inner coating 98 of fiberglass roving whereby a fluid tight seal is formed between the lower and upper halves 52 and 54.

Of course, the body assembly 14 includes rear running and stop light assemblies 100 as well as variously positioned reflectors 102. In addition, the bottom wall 56 is covered by a thick resilient pad 104 over which a sleeping bag or pad 106 may be disposed. The internal dimensions of the body assembly 14 are such that two persons may lie in prone side-by-side positions for sleeping purposes. Of course, either one of the covers 80 or 82 may be propped in a partially open position in order to provide ample ventilation. Further, the upper half may include a substantially full plan area hinged top wall in lieu of the two small openings 76 and 78 and the corresponding hinged covers 80 and 82. Also, the bottom wall 56 may include longitudinal stiffening ribs, if desired and the upwardly offset tow hitch 50 may be carried by straight forwardly projecting forward ends of the tubular members 38 and 40, if desired.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A trailer including a main frame having front and rear end portions, said front end portion including a forwardly projecting towing tongue means, said rear end portion including opposite side ground engageable support wheels, a body assembly for said main frame, said body assembly including an upwardly opening tray-type lower half defining a generally horizontal bottom wall and at least substantially peripherally continuous upwardly projecting peripheral walls each lying in a substantially vertical plane and extending about and supported from the outer periphery of said bottom wall, said body assembly also including a downwardly opening upper half defining a top wall and at least substantially peripherally continuous downwardly projecting skirt walls extending about said upper half, said upper half being downwardly telescoped over the lower half with at least the lower marginal portions of said skirt walls lapped over and sealed relative to at least the upper marginal portions of the lower half peripheral walls, opposite side portions of said skirt walls including front and rear ends, said side portions each, intermediate said front and rear ends, being vertically abbreviated and terminating downwardly in outwardly flaring and vertically arched downwardly opening integral fenders projecting laterally outwardly of the remainder of said side portions, opposite side portions of said lower half peripheral walls including portions corresponding to said vertically abbreviated skirt wall portions including upwardly arched extensions where upper edges abuttingly engage and are sealed to the underside portions of the inner portions of said fenders, said upwardly arched extensions defining inner fender well walls, said wheels including upper peripheral portions over which said fenders extend and spaced at least slightly outwardly of said inner fender well walls.

2. The trailer of claim 1 wherein said top wall includes at least one access opening and a cover movable into and out of position closing said access opening.

3. The trailer of claim 1 wherein said top wall includes a forwardly and downwardly inclined front portion and a rearwardly and downwardly inclined rear portion.

4. The trailer of claim 3 wherein said forwardly and downwardly inclined front portion of said top wall is of a greater extent measured longitudinally of said body assembly than the extent of said rearwardly and downwardly inclined rear portion of said top wall.

5. The trailer of claim 4 wherein each of said front and rear portions of said top wall have an access opening formed therein, and a cover movable into and out of position closing each of said access openings.

6. The trailer of claim 5 wherein said covers are hinge supported from said front and rear portions of said top wall.

7. The trailer of claim 1 wherein said main frame comprises a ladder-type frame including opposite side longitudinal frame members interconnected by longitudinally spaced and transversely extending transverse frame members.

8. The trailer of claim 7 wherein said towing tongue means includes a pair of side-by-side longitudinally extending tongue members generally centered between the longitudinal frame members of said frame and underlying and anchored relative to at least those transverse frame members spaced forward of said wheels and the forward ends of said tongue members project forwardly of the forward end of said main frame and support a hitch member therefrom.

9. The trailer of claim 8 wherein said wheels are journalled from a transverse axle member supported from said frame and the rear ends of said tongue members are anchored relative to the central portion of said axle member.

10. The trailer of claim 9 wherein said top wall includes a forwardly and downwardly inclined front portion and a rearwardly and downwardly inclined rear portion.

11. The trailer of claim 10 wherein said forwardly and downwardly inclined front portion of said top wall is of a greater extent measured longitudinally of said body assembly than the extent of said rearwardly and downwardly inclined rear portion of said top wall.

12. The trailer of claim 11 wherein said top wall includes at least one access opening and a cover movable into and out of position closing said access opening.

* * * * *